(12) United States Patent
Priegnitz et al.

(10) Patent No.: US 7,088,602 B2
(45) Date of Patent: Aug. 8, 2006

(54) ACTIVE GATE CLAMP CIRCUIT FOR SELF DRIVEN SYNCHRONOUS RECTIFIERS

(75) Inventors: Robert A. Priegnitz, Algonquin, IL (US); Charles A. Devries, Jr., Lisle, IL (US)

(73) Assignee: Texas Instruments Incorporated, Dallas, TX (US)

( * ) Notice: Subject to any disclaimer, the term of this patent is extended or adjusted under 35 U.S.C. 154(b) by 237 days.

(21) Appl. No.: 09/768,504

(22) Filed: Jan. 25, 2001

(65) Prior Publication Data

US 2002/0097588 A1 Jul. 25, 2002

(51) Int. Cl.
*H02M 7/217* (2006.01)
(52) U.S. Cl. .................................................. 363/127
(58) Field of Classification Search ................ 363/15, 363/16, 20, 21.04, 21.06, 97, 125, 127, 81, 363/84, 89
See application file for complete search history.

(56) References Cited

U.S. PATENT DOCUMENTS

| | | | | |
|---|---|---|---|---|
| 5,590,032 A | * | 12/1996 | Bowman et al. ............... 363/15 |
| 5,708,571 A | * | 1/1998 | Shinada ......................... 363/16 |
| 5,726,869 A | * | 3/1998 | Yamashita et al. ........ 363/21.06 |
| 5,734,563 A | * | 3/1998 | Shinada .................... 363/21.06 |
| 5,956,245 A | | 9/1999 | Rozman |
| 6,011,703 A | * | 1/2000 | Boylan et al. ............ 363/21.06 |
| 6,038,148 A | * | 3/2000 | Farrington et al. ........... 363/127 |
| 6,069,799 A | * | 5/2000 | Bowman et al. ............... 363/20 |
| 6,169,683 B1 | * | 1/2001 | Farrington ................... 363/127 |
| 6,304,461 B1 | * | 10/2001 | Walker ........................ 363/17 |
| 6,570,268 B1 | * | 5/2003 | Perry et al. .................... 307/38 |

FOREIGN PATENT DOCUMENTS

| | | |
|---|---|---|
| JP | 09365516 | 9/1999 |
| JP | 10358046 | 6/2000 |

OTHER PUBLICATIONS

Ionel Dan Jitaru, High-Efficiency Rectification Techniques for Low Output Voltage and High Output Voltage Applications, Fourteenth Annual Applied Power Electronics Conferece, Dallas, Texas, Mar. 1999, APEC'99 Seminar 3.
Laszio Balogh, Practical Considerations for MOSFET Gate Drive Techniques in High Speed, Switch-Mode Applications, Fourteenth Annual Applied Power Electronics Conference, Dallas, Texas, Mar. 1999, APEC'99 Seminar 10.

* cited by examiner

*Primary Examiner*—Gary L. Laxton
(74) *Attorney, Agent, or Firm*—W. Daniel Swayze, Jr.; W. James Brady; Frederick J. Telecky, Jr.

(57) ABSTRACT

A DC-DC converter circuit includes a transformer with a resonate filter or snubber connected at a primary side and a switch for controlling operation of the converter. A secondary side of the transformer includes self-driven synchronous rectifiers and an output filter. Transistors are provided at the gates leads of the rectifiers and themselves are provided with a fixed voltage at their gates so as to clamp the peak voltages across to the rectifiers.

15 Claims, 4 Drawing Sheets

ACTIVE GATE CLAMP CIRCUIT FOR SELF DRIVEN SYNCHRONOUS RECTIFIERS

BACKGROUND OF THE INVENTION

1. Field of the Invention

The present invention related generally to DC-DC voltage converters and, in particular, to synchronous rectifying DC voltage converters.

2. Description of the Prior Art

Electronic devices are generally supplied with power from a power supply unit that converts AC line power to a DC voltage. However, various components in the electronic devices may require different voltages than is supplied by the power supply. In addition, some of these components require a highly regulated voltage to operate properly. DC to DC converters are used to convert the output of the power supply unit to a different, regulated voltage.

Electronic devices which may use DC to DC converters are computers, network cards, DSL (Digital Subscriber Line) cards, and the like. The DC to DC converters may be required to produce a 5 volt regulated output, or in some cases a 3 volt regulated output, 12 volt regulated output or 15 volt regulated output, for example. In a computer, the power supply unit may produce one voltage for supply to components such as disk drives while another lower voltage is required for the memory chips or processor. It is important in such applications that this lower voltage level be maintained as precisely as possibly since the logic circuitry depends upon voltage levels for accuracy. This is true even when current demands are being placed on the main power supply for instance during start-up when the disk drives are operating and drawing more power than usual.

One type of DC-DC voltage converter is known as a synchronous rectifier. The term synchronous rectifier refers to the active element, here a FET operating synchronously with a conducting state of a diode. Synchronous rectifiers are low loss devices. An example of a synchronous rectifier is shown in FIG. 1 in the configuration of a self-driven synchronous rectified forward converter. The device is self-driven by virtue of deriving the driving voltage from the secondary. A cross-connected configuration provides the self-driven aspect, as opposed to use of an external control circuit which would not be self-driven.

In FIG. 1, a DC voltage is applied at an input 10. Also at the input side of the DC-DC power converter is a transistor 12 which serves as a power switch. An inductor 14, a capacitor 16, and a pair of diodes 18 and 20 complete a resonant primary snubber circuit. This snubber circuit is connected to a primary side 22 of an isolation and step-down transformer 24. The secondary 26 of the transformer 24 includes two synchronous rectifiers 28 and 30. The rectified signal from the secondary 26 is filtered by an averaging filter made up of an inductor 32 and a capacitor 34. The node between the inductor 32 and the capacitor 34 serves as an output node to which is connected a load of the DC-DC power converter stage.

A non-synchronous construction of the circuit is also possible by replacement of the transistors or rectifiers 28 and 30 with Schottky diodes.

A problem with the foregoing circuit is that the secondary voltage from the transformer 24 appears directly across the gate-to-source of both of the rectifier elements 28 and 30. Some synchronous rectifier field effect transistors have a maximum gate voltage rating as low as 12 volts. This precludes their use in this type of circuit for all but the lowest output voltages.

Thus, in a self-driven synchronous rectifier, peak gate voltages can easily exceed the gate-source breakdown voltages of the synchronous FETs, particularly at 5 volt outputs or greater. This leads to destruction of the FET and failure of the device. Therefore, it has been required to limit the self-driven synchronous to an output voltage of 5 volts or lower.

One possible way to limit the gate voltages of the FETs is to connect Zener diodes across each of the gate-to-source leads. The Zener diodes limit the voltages but do so by conducting current when the limit voltage is met, resulting in lost energy through the Zener. Thus, this is a lossy circuit. It also results in the nominal output voltage being limited to the Zener voltage.

An alternative is to use integrated circuits to control the FETs, so that the circuit is no longer self-driven. This permits more power to be supplied by the circuit, however, the use of such IC is costly.

SUMMARY OF THE INVENTION

The present invention solves the foregoing problems and provides a synchronous self-driven converter in which a gate voltage is clamped to less than the maximum rated voltage. This is achieved by a clamp circuit using a small field effect transistor (FET) connected as a source follower in series with the gate of the synchronous rectifier FET. The gate voltage of the clamp FET is connected to a voltage source. The clamp limits the source lead of the clamp FET, which is connected to the gate of the synchronous rectifier FET, to the difference between the voltage source and the threshold voltage of the gate of the clamp FET. The clamp operates by effectively opening a switch in series with the gate of the synchronous rectifier FET to protect the gate.

The present invention achieves a solution to the problems of the prior art devices with a minimum of power loss, a minimum of time delay, and at a low cost. A further benefit as will be apparent from the following is that higher output voltages are possible. Additionally, the present circuit offers protection against external voltages at the output which would previously have resulted in the rectifier being turned on but now are shielded so that the rectifier does not turn on.

The efficiency, speed, economy and versatility of the present circuit lends itself to use of the circuit in a wider variety of application with fewer limitations.

DETAILED DESCRIPTION OF THE PREFERRED EMBODIMENTS

Figure 2:
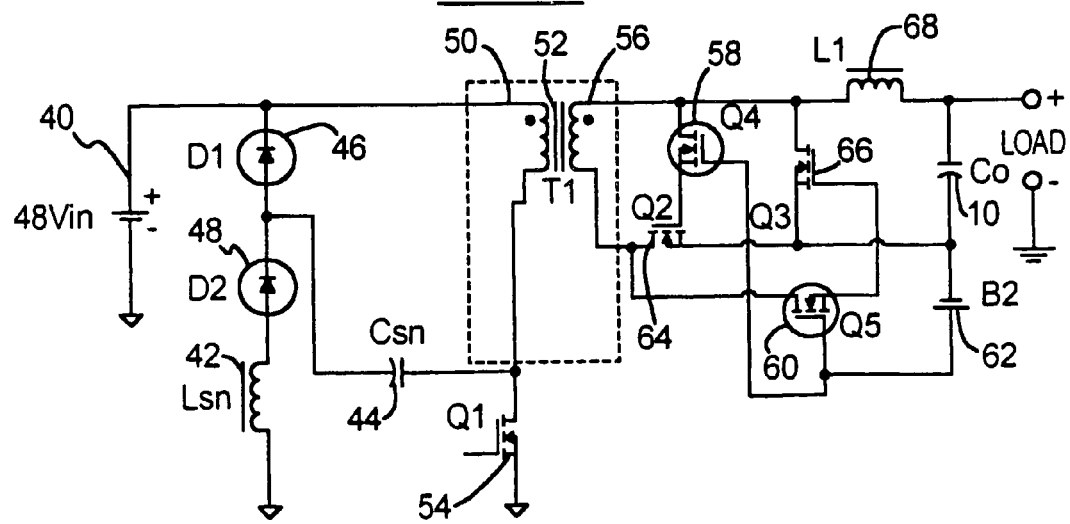
FIG. 2 is a circuit diagram of a synchronous rectified forward converter with field effect transistor clamps according to the present invention.

Referring to FIG. 2, an input voltage 40, which is supplied, for example, by a power supply unit of an electronic device, is provided at an input of a resonant primary snubber circuit including an inductor 42, capacitor 44 and diodes 46 and 48. These are connected to a primary side 50 of an isolation step-down transformer 52. A power switch in the form of a transistor 54 is also provided on the primary side 50. Although this circuit arrangement is shown for the primary side, other circuit arrangements are also possible. For example, resonant reset circuits, both active and passive, on either primary or secondary side of the transformer 51 are possible, as well as different topologies such as a two-transistor forward converter topology. For example, the converter may have a feedback loop connected to the primary side for regulation.

Figure 1:
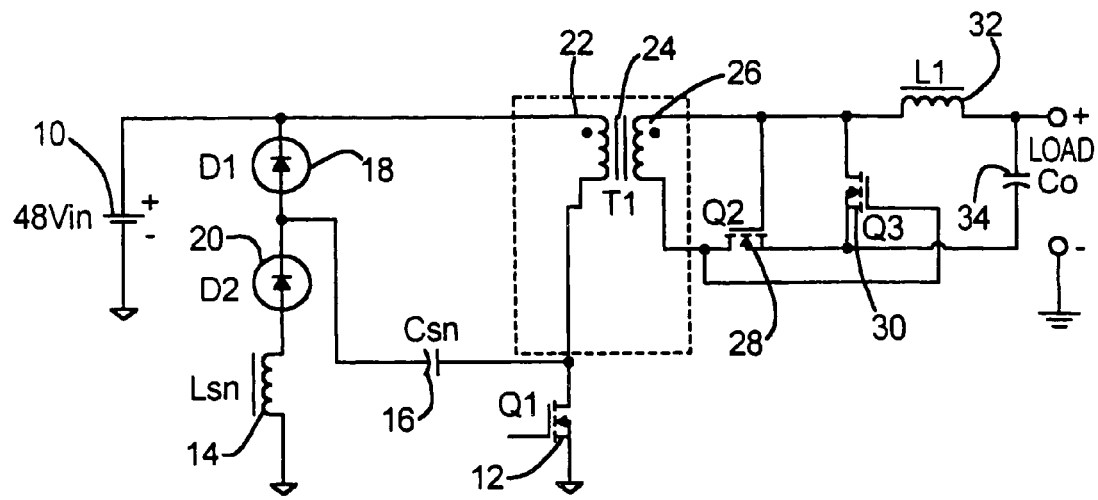
FIG. 1 is a circuit diagram of a typical DC-DC power converter stage with a synchronous rectified forward converter.

On a secondary side 56 of the transformer 52, transistors 58 and 60 have been added to the circuit of FIG. 1. The gates of the transistors 58 and 60 are tied to a fixed voltage source 62. The fixed voltage source 62 of one embodiment is a 12 volt auxiliary voltage that is available from the power supply unit in the electronic device. The secondary side 56 of the transformer 52 is also provided with rectifying transistors 64 and 66 as well as with a filter composed of an inductor 68 and a capacitor 70.

In operation, before the rectifier 66 turns on, its gate is at zero volts. The fixed voltage source 62 is typically 12 volts, so that the transistor 60 is fully enhanced. As a drain voltage is applied to the transistor 60, the gate of the rectifier 66 begins to charge. When the source of the transistor 60 and thus the gate of the rectifier 66 reaches about 10 volts, the transistor 60 turns off. This limits the peak voltage on the gate of the rectifier 66 to about 10 volts. The transistor 58 and rectifier 64 operate in a similar fashion.

The transistors 58 and 60 operate very fast and have moderately low on-resistance to minimize losses in the circuit. The internal source-to-drain diode in the transistors 58 and 60 will allow the gate charge on the transistor 64 and 66 to discharge at the appropriate time driven by the voltage of the secondary winding 56 of the transformer 52.

The present invention relies on the parasitic characteristics of the FETs, in particular, the parasitic capacitances and the diode characteristic, to operate. The FET has a parasitic internal diode (it is built into the device) that is oriented from source to drain and that starts the turn-off process. The voltage across the gate-to-source has a threshold, for instance, 2 volts, which is subtracted from the voltage applied at the gate of the clamp FET to define the clamp voltage. In the present example, this is 10 volts. The clamping FET supplies power to the synchronous rectifier FET to charge the gate-to-source capacitance of the rectifier FET so that the voltage at the gate-to-source of the rectifier FET reaches the clamp voltage and is maintained there.

Voltage conversion is determined by pulses having a selected duty cycle that is filtered, a so-called buck converter. Peak voltages occur due to leakage inductance of the transformer in the circuit. This leads to ringing at the pulse peaks. The synchronous rectifier appears to the circuit like a large capacitance. The clamp acts like a small resistor in the circuit that decreases the ringing. In a preferred development of the invention, a small resistor is connected in series with the gate to damp the ringing. A 100 ohm resistor is appropriate for this purpose.

The average current carrying capacity of the clamping FETs is in the mAmp range, but the peak current required for charging the capacitance of the rectifier FET may be several Amps. The FETs should be chosen so that the drain-to-source capacitance of the clamp FET is much less than the gate-to-source capacitance of the rectifier FET. The FET should have a voltage rating sufficient to take the peak voltage in the circuit, and should have an on-resistance that is not too large. It is preferred that the on-resistance of the clamp FET be no larger than an ohm.

Figure 3A:
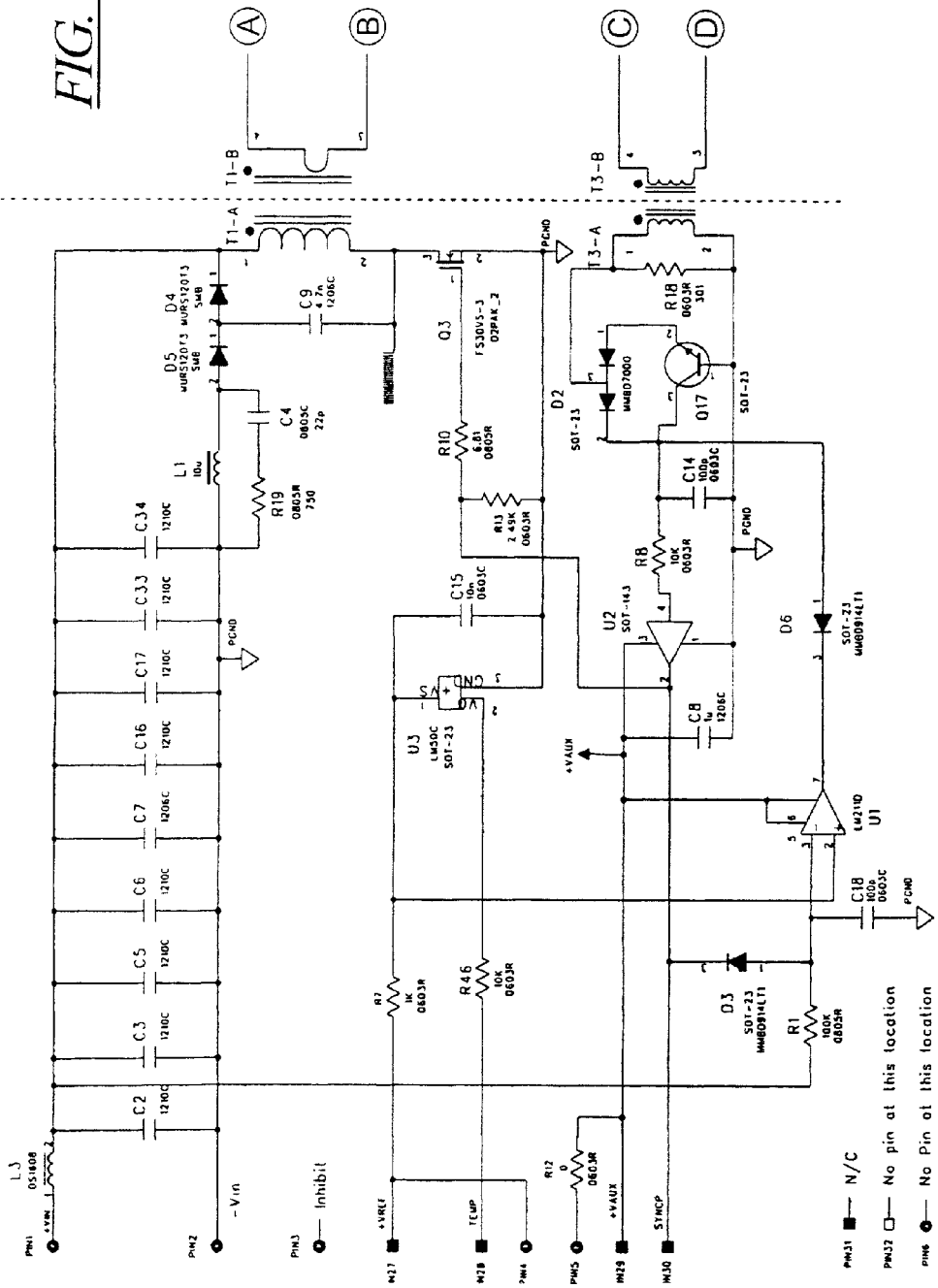
FIGS. 3A and 3B are two parts of a detailed circuit diagram of the present invention as used in a typical application.
Figure 3B:
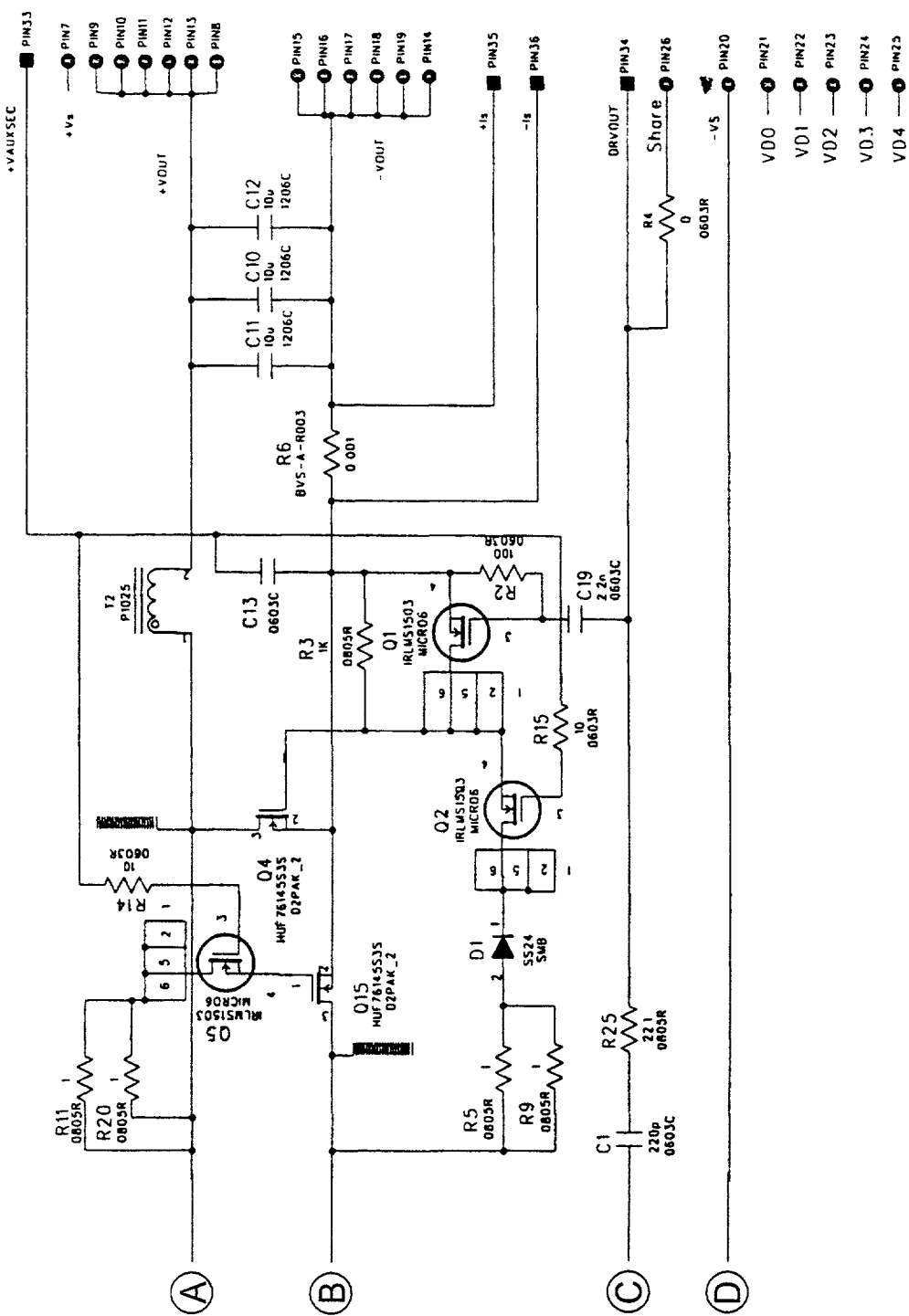

FIG. 3A and 3B show an exemplary embodiment of the present invention in an actual application. In the illustrated embodiment, the clamp FETs are Q2 and Q5. Although many different FETs may be used for the clamping function, one example is International Rectifier part number IRLMS1503.

The present invention may be utilized in circuits of a variety of configurations. Examples of some additional circuits which benefit from the active gate clamping of the invention are set forth hereinafter.

Figure 4:
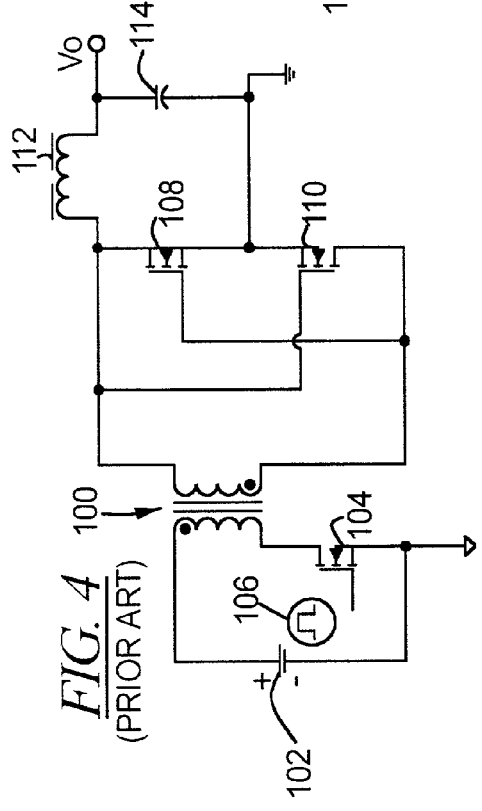
FIG. 4 is a circuit diagram of a known flyback converter.

FIG. 4 is a simplified circuit diagram of a known flyback converter with self-driven synchronous rectifiers. A transformer 100 in the circuit is connected with the primary and secondary windings at opposite polarities. The circuit connected to the primary winding of the transformer 100 is in its most basic form a voltage supply 102 and a switch 104, shown here as a FET. A pulse 106 at a duty cycle as determined by a control (not shown) is provided at the gate, or control lead, of the switch 104.

The secondary side circuit of FIG. 4 includes two FETs 108 and 110 connected for synchronous operation. An inductor 112 in series to the output and a capacitor 114 across the output provide filtering of the output signal.

Figure 5:
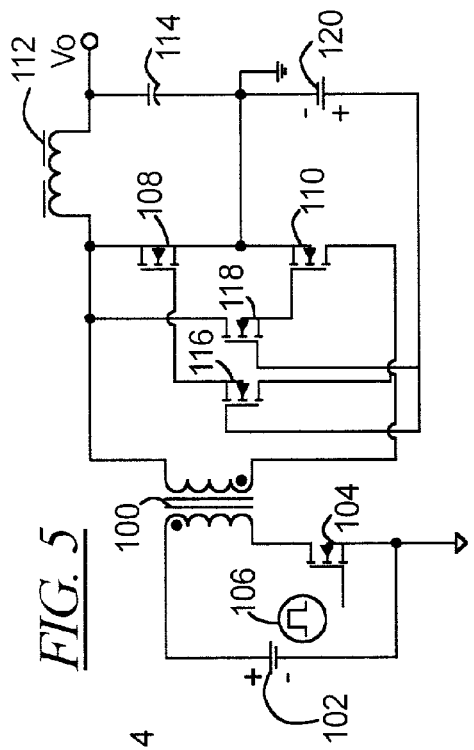
FIG. 5 is a circuit diagram of a flyback converter including an active gate clamp according to the present invention.

The improvement to the circuit of FIG. 4 is shown in FIG. 5, wherein active gate clamp FETs 116 and 118 have been added to the circuit. As before, these are connected at the gates of the respective synchronous FETs 108 and 110. The gates of the clamp FETs 116 and 118 are connected to a voltage such as the voltage source 120, as already discussed.

Figure 6:
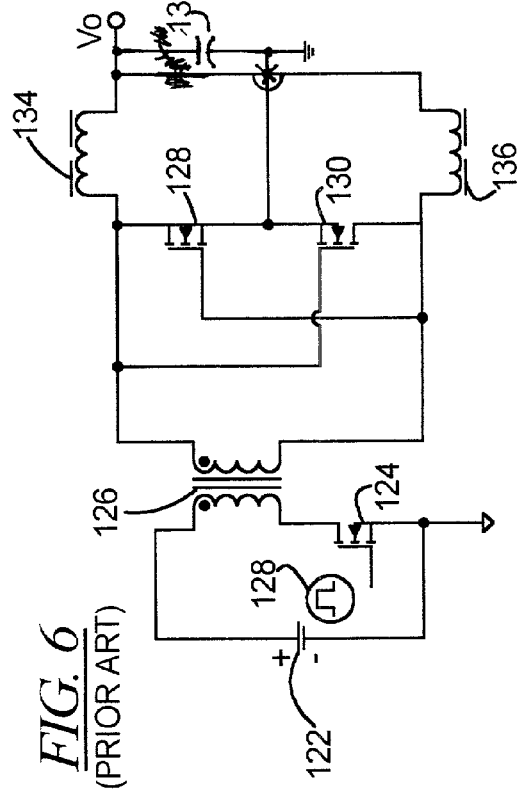
FIG. 6 is a circuit diagram of a current doubler converter of a known embodiment.

Another example of a circuit which benefits from the present invention is shown in FIG. 6. In FIG. 6 is shown a double-ended current doubler converter with self-driven rectifiers. The primary side in its simplest form is a voltage source 122 connected through a switch 124 to the primary winding of a transformer 126. A control pulse 128 is input to the gate or control lead of the switch 124, that is shown here as a FET.

The transformer 126 is connected with the polarities of the winding in the same direction. On the secondary side, the two FETs 128 and 130 are in the synchronous configuration. A capacitor 132 is across the output for filtering, but the output inductance is split and provided by two inductors 134 and 136. This is referred to as a split choke output.

Figure 7:
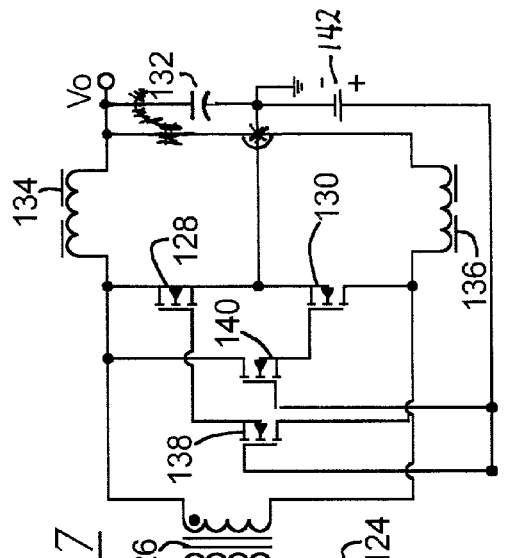
FIG. 7 is a circuit diagram of the current doubler converter including an active gate clamps according to the principles of the present invention.

FIG. 7 provides an improvement over the circuit of FIG. 6 in which active gate clamps 138 and 140 are provided for the synchronous FETs 128 and 130, respectively. The clamps 138 and 140 are FETs. A voltage source 142 is connected to the gates of the two clamps 138 and 140.

In the circuits of FIGS. 5 and 7, the clamp elements operate the same way as described in conjunction with the circuit of FIG. 2.

The present invention may be used in circuits which use a full bridge topology or half bridge topology. Another possibility is to use the present invention in a push-pull configuration. The circuit according to the invention may also include an active clamp reset.

Thus, there is shown and described a self-driven synchronous rectification circuit which solves the breakdown problem of the prior art by clamping the gate voltage to less than the maximum rated voltage. This is done with a minimum of power loss and a minimum of time delay. The present invention provides the solution to the problems set forth in the foregoing at very low cost since integrated circuits are not required. In particular, it solves the gate-to-source limitations of synchronous rectifiers. It also provides a circuit with low loss, particularly compared to the circuits that use Zener diodes. Efficiency of the circuit is maintained.

It is foreseeable to use bipolar transistors in the rectifier or IGBTs. It is also foreseeable to provide a self driven primary for the converter, instead of the secondary.

Although modifications and changes may be suggested by those skilled in the art, it is the intention of the inventor to embody within the patent warranted hereon all changes and modifications as reasonably and properly come within the scope of his contribution to the art.

We claim as our invention:

1. A rectifier, comprising:
   a reference primary circuit;
   a transformer having a primary side connected to said reference primary circuit and having a secondary side;
   first and second rectifiers in synchronous connection at said secondary side, said first and second rectifiers each having at least three leads, one of said three leads being a control lead;
   first and second clamping transistors, said first clamping transistor being connected between said control lead of said first rectifier and said secondary side, said second clamping transistor being connected between said control lead of said second rectifier and said secondary side;
   a first damping resistor connected to a control lead of said first clamping transistor and a second damping resistor connected to a control lead of said second clamping transistor;
   a load connected to a same winding of said secondary side as said first and second clamping transistors; and
   a fixed voltage source connected to said first and second damping resistors to supply a fixed voltage to said control leads of said first and second transistors.

2. A rectifier as claimed in claim 1, wherein said secondary of said transformer has first and second leads, said first rectifier having first and second leads connected in series to said first lead of said secondary and said control lead connected to said second lead of said secondary, said second rectifier having first and second leads across said first and second leads of said secondary and said control lead connected to said first lead of said secondary.

3. A rectifier as claimed in claim 2, wherein said control lead of said first rectifier is connected through said first clamping transistor to said second lead of said secondary;
   said first lead of said second rectifier is connected to said first lead of said secondary through said first rectifier; and
   said control lead of said second rectifier connected through said second clamping transistor to said first lead of said secondary.

4. A rectifier as claimed in claim 1, wherein said first and second rectifiers and said first and second clamping transistors are field effect transistors and said control leads are gate leads.

5. A rectifier as claimed in claim 1, further comprising:
   an output;
   a first filter element connected between said first rectifier and said output; and
   a second filter element connected between said output and ground.

6. A rectifier as claimed in claim 5, wherein said first filter element includes an inductance and said second filter element includes a capacitance.

7. A rectifier as claimed in claim 5, further comprising:
   a third filter element connected between said second rectifier and ground.

8. A rectifier as claimed in claim 7, wherein said first and third filter elements include an inductance.

9. A rectifier as claimed in claim 1, wherein said transformer is connected with its windings at a same polarity.

10. A rectifier as claimed in claim 1, wherein said transformer is connected with its windings at opposite polarity.

11. A self-driven synchronous rectifier, comprising:
    a transformer having a primary and seconding winding;
    an input for an input voltage connected to said primary winding;
    a pair of rectifiers connected in a synchronous connection,
       a first rectifier of said pair of rectifiers including a source drain connection in series with a first lead of said secondary winding and a gate connected to a second lead of said secondary winding;
       a second rectifier of said pair of rectifiers having a source and drain leads connected across said first and second leads of said secondary winding and a gate connected to said first lead of said secondary winding;
    a first transistor connected between said gate of said first rectifier and said second lead of said secondary winding;
    a first damping resistor connected to a control lead of said first transistor;
    a second transistor connected between said gate of said second rectifier and said first lead of said secondary winding;
    a second damping resistor connected to a control lead of said second transistor;
    a load connected to said secondary winding of said transformer; and
    a voltage source connected to said first and second damping resistors to supply a voltage through said damping resistors to control leads of said first and second transistors.

12. A synchronous rectifier as claimed in claim 11, further comprising:
    a filter connected across said secondary winding of said transformer.

13. A synchronous rectifier as claimed in claim 11, further comprising:
    a resonate snubber connected across said primary winding of said transformer, said resonate snubber including a filter.

14. A synchronous rectifier as claimed in claim 11, further comprising:
    a switch connected at said primary winding of said transformer.

15. A synchronous rectifier as claimed in claim 11, wherein said first and second transistors are field effect transistors and said control leads are gate leads.

* * * * *